(12) United States Patent  (10) Patent No.: US 8,155,608 B2
Xing et al.  (45) Date of Patent: Apr. 10, 2012

(54) SYSTEM AND METHOD FOR ENHANCED PARALLEL RECEIVING INTERWORKING IN A WIRELESS COMMUNICATIONS SYSTEM

(75) Inventors: Shuqing Xing, San Diego, CA (US); Patrick Ahamad Hosein, San Diego, CA (US); Young Hoon Kwon, San Diego, CA (US); Jun Hu, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 387 days.

(21) Appl. No.: 12/617,555

(22) Filed: Nov. 12, 2009

(65) Prior Publication Data

US 2011/0021158 A1    Jan. 27, 2011

Related U.S. Application Data

(60) Provisional application No. 61/228,486, filed on Jul. 24, 2009.

(51) Int. Cl.
*H04B 17/02* (2006.01)
(52) U.S. Cl. ...... 455/132; 455/230; 455/436; 455/160.1
(58) Field of Classification Search ............ 455/132, 455/130, 133, 137, 140, 230, 436, 439, 445, 455/516, 517, 526, 63.2, 150.1, 160.1, 178.1, 455/434; 370/328, 331, 338
See application file for complete search history.

(56) References Cited

U.S. PATENT DOCUMENTS

| | | | |
|---|---|---|---|
| 6,978,138 B2 * | 12/2005 | Japenga et al. | 455/436 |
| 7,089,009 B1 | 8/2006 | Fauconnier | |
| 7,535,846 B2 * | 5/2009 | Kim et al. | 370/241 |
| 7,986,712 B2 * | 7/2011 | Ponnampalam et al. | 370/468 |
| 8,005,482 B2 * | 8/2011 | Tolli et al. | 455/453 |
| 2002/0160785 A1 | 10/2002 | Ovesjo et al. | |
| 2007/0155344 A1 | 7/2007 | Wiessner et al. | |
| 2007/0213059 A1 | 9/2007 | Shaheen | |
| 2007/0254692 A1 | 11/2007 | McCoy | |

(Continued)

FOREIGN PATENT DOCUMENTS

AU    2006349035 A1    4/2008

(Continued)

OTHER PUBLICATIONS

International Search Report and the Written Opinion of the International Searching Authority, International Application No. PCT/CN2009/075116, Applicant: Huawei Technologies Co., Ltd., Mar. 11, 2010, 10 pages.

(Continued)

*Primary Examiner* — Pablo Tran

(74) *Attorney, Agent, or Firm* — Slater & Matsil, L.L.P.

(57) ABSTRACT

A system and method for enhanced parallel receiving interworking in a wireless communications network. A method for controller operation where the controller serves a communications device having at least two receivers includes detecting that the communications device has at least one receiver tuned to a current radio access technology (RAT) and at least one receiver tuned to an alternate RAT, adjusting a network parameter to alter the communication network's performance, and readjusting the network parameter back to its original value in response to determining that the communications device no longer has any receiver tuned to the alternate RAT. The adjusted network parameter impacts only the communications device.

23 Claims, 5 Drawing Sheets

U.S. PATENT DOCUMENTS

| | | | |
|---|---|---|---|
| 2008/0298320 A1* | 12/2008 | Ligonniere et al. | 370/331 |
| 2009/0017823 A1 | 1/2009 | Sachs et al. | |
| 2009/0023448 A1* | 1/2009 | Attar et al. | 455/436 |
| 2010/0099416 A1 | 4/2010 | Kazmi et al. | |
| 2010/0260147 A1* | 10/2010 | Xing et al. | 370/332 |
| 2011/0021158 A1 | 1/2011 | Xing et al. | |
| 2011/0176430 A1* | 7/2011 | Zetterberg et al. | 370/242 |
| 2011/0206009 A1* | 8/2011 | Attar et al. | 370/331 |
| 2011/0263250 A1* | 10/2011 | Mueck et al. | 455/434 |

FOREIGN PATENT DOCUMENTS

| | | |
|---|---|---|
| CN | 1350763 A | 5/2002 |
| CN | 1988485 A | 6/2007 |
| CN | 101277514 A | 10/2008 |
| CN | 101401470 | 4/2009 |
| CN | 101483897 A | 7/2009 |
| EP | 1 886 521 A1 | 2/2008 |
| WO | WO 2007/103496 A1 | 9/2007 |

OTHER PUBLICATIONS

International Search Report and the Written Opinion of the International Searching Authority, International Application No. PCT/CN2010/075377, Applicant: Huawei Technologies Co., Ltd., Nov. 4, 2010, 11 pages.

* cited by examiner

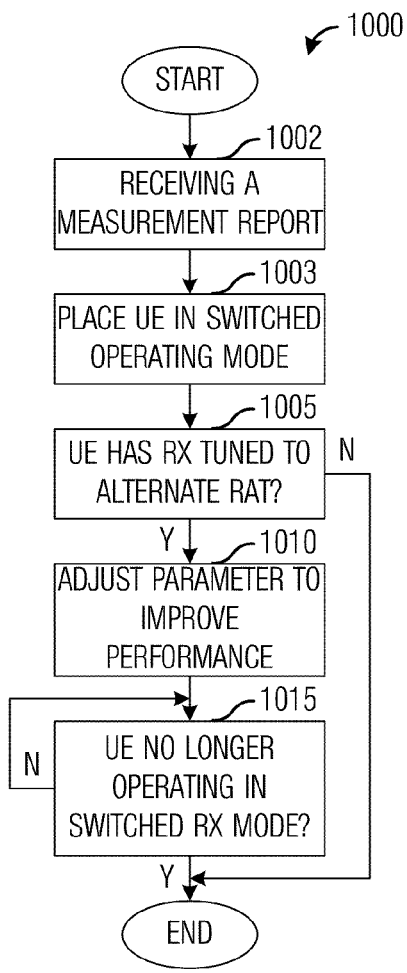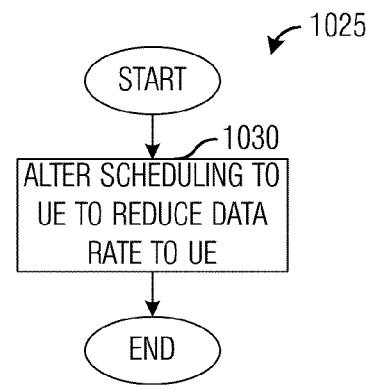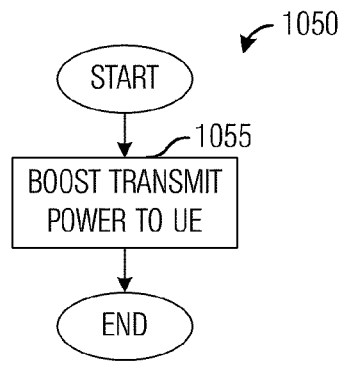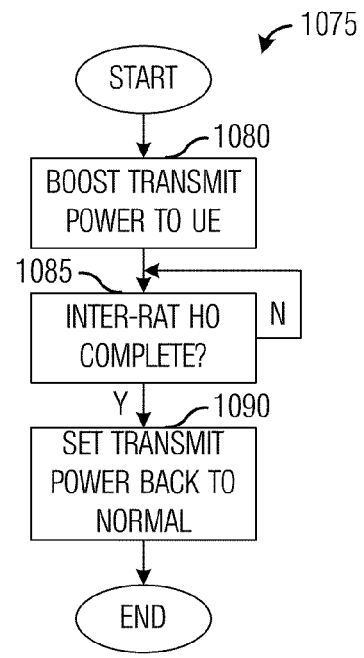
Fig. 9a
Fig. 9b
Fig. 9c
Fig. 9d

SYSTEM AND METHOD FOR ENHANCED PARALLEL RECEIVING INTERWORKING IN A WIRELESS COMMUNICATIONS SYSTEM

This application claims the benefit of U.S. Provisional Application No. 61/228,486, filed on Jul. 24, 2009, which application is hereby incorporated herein by reference.

TECHNICAL FIELD

The present invention relates generally to wireless communications, and more particularly to a system and method for enhanced parallel receiving interworking in a wireless communications network.

BACKGROUND

As wireless communications systems continue to evolve and improve, it may be common for a service area to be served by multiple wireless communications systems as service providers upgrade equipment while keeping older equipment operational for compatibility purposes as well as improved coverage. In order to maximize user equipment (UE) flexibility, UE may be operable in the multiple wireless communications systems. UEs may also be referred to as mobile stations (MS), terminals, users, communications devices, and so forth.

FIG. 1 illustrates a wireless communications system 100. Wireless communications system 100 includes a first wireless communications network 105 that makes use of a first radio access technology (RAT_1) and a second wireless communications network 110 that makes use of a second radio access technology (RAT_2). RAT_2 may be an older access technology that has been in use for a longer period of time, hence second wireless communications network 110 may have a larger coverage area than first wireless communications network 105. For example, RAT_2 may be a first or second generation access technology, such as code division multiple access (CDMA), CDMA2000, high rate packet data (HRPD), and so on, while RAT_1 may be a third or fourth generation access technology, such as long term evolution (LTE), LTE-Advanced, WiMAX, and so forth.

Wireless communications system 100 also includes UEs, such as UE 115, UE 120, and UE 125. The UEs may be capable of operating in both first wireless communications network 105 and second wireless communications network 110. The UEs may also be capable of changing service from first wireless communications network 105 to second wireless communications network 110, and vice versa. This is commonly referred to as a handover.

As shown in FIG. 1, UE 115 may be operating in a center of first wireless communications network 105 (which is also in a coverage area of second wireless communications network 110), and since first wireless communications network 105 may offer higher data rates, more functionality, etc., UE 115 may prefer to be served by a controller of first wireless communications network 105. UE 120 may be operating in a coverage area of second wireless communications network 110 that is outside of a coverage area of first wireless communications network 105, so UE 120 may be served by a controller of second wireless communications network 110 by default.

A controller of a wireless communications network may control transmissions to and from a UE that it is serving. For example, the controller may receive a transmission intended for the UE and store (buffer) the transmission until it forwards the transmission to the UE. Additionally, the controller may control transmissions made by the UE by allocating network resources to the UE, without which, the UE may not be able to transmit. The controller may also be referred to as a base station (BS), base terminal station (BTS), NodeB, enhanced NodeB (eNB), and so forth.

UE 125 may be operating in a border cell (also referred to as a border cell scenario) of first wireless communications network 105, wherein UE 125 may be receiving transmissions from first wireless communications network 105 at low power levels. In such a situation, UE 125 may be a candidate for a handover from first wireless communications network 105 (also referred to as a current RAT) to second wireless communications network 110 (also referred to as an alternate RAT) if it is capable of receiving better service from second wireless communications network 110.

SUMMARY OF THE INVENTION

These and other problems are generally solved or circumvented, and technical advantages are generally achieved, by embodiments of a system and method for dynamically assigning persistent resources in a wireless communications system.

In accordance with an embodiment, a method for controller operation is provided. The controller serving a communications device in a communications network and the communications device has at least two receivers. The method includes detecting that the communications device has at least one receiver tuned to a current radio access technology (RAT) and at least one receiver tuned to an alternate RAT, adjusting a network parameter to alter the communication network's performance, and readjusting the network parameter back to its original value in response to determining that the communications device no longer has any receiver tuned to the alternate RAT. The adjusted network parameter impacts only the communications device.

In accordance with another embodiment, a method for controller operation is provided. The controller serving a communications device in a communications network. The method includes receiving a measurement report from the communications device, and transmitting a receiver switch message to the communications device. The method also includes in response to determining that the communications device has at least one receiver tuned to an alternate radio access technology (RAT), adjusting transmission parameters of transmissions to the communications device, and readjusting the transmission parameters back to their original values in response to determining that the communications device no longer has any receiver tuned to the alternate RAT. The adjusted network parameter impacts only the communications device.

In accordance with another embodiment, a method for controller operation is provided. The controller serving a communications device in a communications network. The method includes receiving a measurement report from the communications device, transmitting a receiver switch message to the communications device, adjusting a network parameter to alter the communication network's performance, and readjusting the network parameter back to its original value in response to determining that the communications device has completed an inter-radio access technology (inter-RAT) handover with an alternate communications system. The adjusted network parameter impacts only the communications device, and the alternate communications system uses the alternate RAT.

An advantage of an embodiment is that when at least one of a UE's receivers is tuned to an alternate RAT, the overall performance of the UE with its current RAT is not degraded, which may otherwise lead to dropped connections, low customer satisfaction, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 9a is a flow diagram of eNB operations in switched operating mode;

FIG. 9b is a flow diagram of eNB operations in adjusting network parameters;

FIG. 9c is a flow diagram of eNB operations in adjusting network parameters; and FIG. 9d is a flow diagram of eNB operations in adjusting network parameters.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with a first wireless communications network (for example, CDMA) and a second wireless communications network (for example, LTE) configured as an overlay. The second wireless communications network may be more advanced and offers higher data rate, more functionality, and so forth, but a smaller coverage area than the first wireless communications network. The invention may also be applied, however, to other wireless communications network combinations, such as CDMA-LTE-A, HRPD-LTE, HRPD-LTE-A, CDMA2000-LTE, CDMA2000-LTE-A, CDMA-WiMAX, CDMA2000-WiMAX, CDMA-UMTS, CDMA2000-UMTS, WiMAX-LTE, WiMAX-LTE-A, UMTS-LTE, UMTS-LTE-A, and so on.

According to the Third Generation Partnership Project (3GPP) LTE Revision Eight technical standard, a UE may have one transmitter and two receivers (enabling the UE to simultaneously receive two different RATs using two radio frequency (RF) chains) or one transmitter and one receiver (enabling the UE to receive one RAT at a time). However, current implementations of UEs uses a single radio only that includes two receivers to support 2×2 multiple input, multiple output (MIMO) operation. In 2×2 MIMO, both receivers operate with a single RAT.

Furthermore, there is a desire with wireless communications system providers to use UEs with only one transmitter and two receivers (1TX/2RX) due to reduced UE cost and reduced power consumption (increased battery life) associated with reduced RF circuitry. The two receivers may need to be fully configurable to enable support both 2×2 MIMO operation (both receivers tuned to a single RAT) and tuning to separate RATs (each receiver tuned to a different RAT.

The multiple receivers may typically be used to support MIMO operation in a current RAT and provide improved performance through antenna diversity, beam forming, and so forth. However, it may be possible to use the multiple receivers independently to help reduce handover delay, reduce drop call rates, and so forth, especially in situations wherein a UE is operating in a border cell where network conditions may not be conducive to MIMO operation. In such a situation, it may be possible to tune one of the multiple receivers to an alternate RAT, wherein the receiver tuned to the alternate RAT may be able to obtain information related to the alternate RAT, which may help expedite an inter-RAT handover. Since one or more other receivers remain tuned to the current RAT, the connection or call between the UE and the current RAT is maintained.

Figure 1:
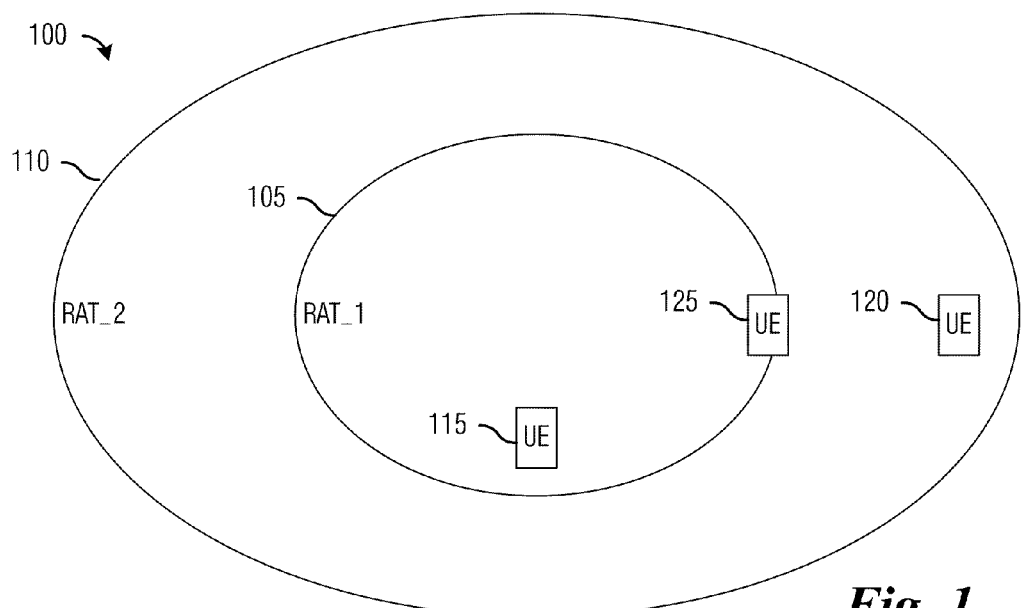
FIG. 1 is a diagram of a wireless communications system.
Figure 2:
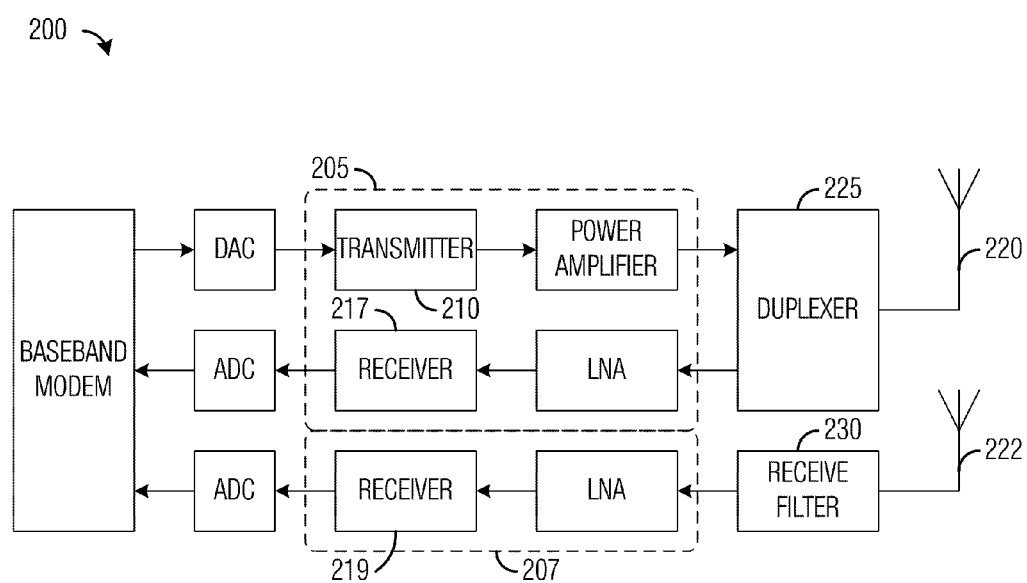
FIG. 2 is a diagram of a portion of a RF circuit of a UE.

FIG. 2 illustrates a portion of a RF circuit 200 of a UE. As shown in FIG. 2, RF circuit 200 includes two RF chain, RF chain 205 and RF chain 207. RF chain 205 comprises one transmitter 210 and one receiver 217, while RF chain 207 comprises one receiver 219. Transmitter 210 and receiver 217 may share a first single antenna 220 through a duplexer (or RF switch) 225, while receiver 219 may have exclusive use of a second single antenna 222 through receive filter 230.

Although shown in FIG. 2 as having two receivers, a UE may have any number of receivers, such as two, three, four, five, six, and so forth. A limit on the number of receivers may be technical standard requirements as well as available silicon space for implementing receivers, antennas, baseband processors, and so forth. Therefore, the illustration and discussion of two receivers should not be construed as being limiting to either the scope or the spirit of the embodiments.

Figure 3:
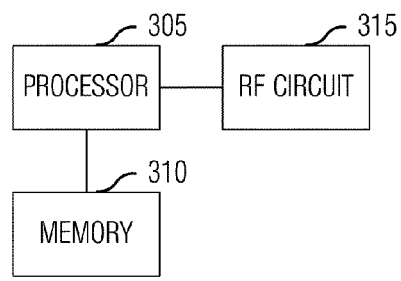
FIG. 3 is a diagram of a UE.

FIG. 3 illustrates a UE 300. UE 300 includes a processor 305, a memory 310, and RF circuit 315. Processor 305 may be used to execute applications and programs, as well as a user interface, to allow a user to communicate, share data, multimedia, and so forth, with servers and other users wirelessly connected to the user. Memory 310 may be used to store the applications, programs, data, multimedia, and so forth. RF circuit 315 may be used to allow UE 300 to wirelessly connect to a wireless communications network and transmit and receive data, multimedia, and so on. RF circuit 315 includes a multiple receiver that may be independently tuned to different RATs to help reduce inter-RAT handover delay and decrease drop connection rates.

In co-assigned and co-pending patent application Ser. No. 12/617,466, filed Nov. 12, 2009, entitled "System and Method for Supporting Handovers Between Different Radio Access Technologies of a Wireless Communications System," and incorporated herein, a switching operating mode is presented wherein a UE may switch one or more fully configurable receivers to tune to an alternate RAT for a period of time and then switch the one or more fully configurable receivers back to tune to a current RAT. While the one or more fully configurable receivers are tuned to the alternate RAT, the UE keeps at least one receiver tuned to the current RAT, which may receive transmissions to maintain an active connection. While tuned to the alternate RAT, the UE may retrieve system information pertaining to the alternate RAT, such as system parameters, channel information, and so forth. The system information may be helpful in expediting an inter-RAT handover should one become necessary (e.g., should the UE move to an area with poor signal strength from the current RAT and good signal strength for the alternate RAT).

Advantages of using one or more receivers to tune to the alternate RAT may include: overall system performance (user throughput, for example) not being (or very slightly) impacted by tuning away the receiver, inter-RAT handover latency may be reduced, connection with current RAT may be maintained, and so forth.

However, with one or more receivers tuned to the alternate RAT, not as many receivers are available to tune to the current RAT. The fewer number of receivers available to tune to the current RAT may reduce the performance of the UE in the current RAT. For example, if the UE comprises two receivers and one receiver is tuned to the alternate RAT, then only one receiver is available to tune to the current RAT. Since, Rank 2 MIMO operating mode (i.e., beam forming) requires at least two receivers, Rank 1 MIMO operating mode (i.e., antenna diversity) may be the only MIMO alternative.

Therefore, if the number of receivers available for use with the current RAT is lower than a number required for a particular MIMO operating mode, then a lower MIMO operating mode may need to be used, which may lead to lower performance (e.g., lower data rate, higher error rates, and so forth).

Performance analysis of the impact on performance arising from not using a second receiver, which may be simplified into a case of not using a secondary antenna, may depend heavily on the link quality of the secondary antenna. A comparison of commonly available hardware designs, for a data card, a secondary antenna may have about 3 dB or more loss than a primary antenna, while for a UE, a secondary antenna may have 3 dB or more loss than the primary antenna.

For example, with an ETU60 channel model using space-frequency block coding (SFBC), the maximum performance loss in dB between a two receiver device and a one receiver device is about 3.8 dB. Table 1 summarizes the performance loss for several different two receiver-one receiver scenarios.

TABLE 1

Two Receiver/One Receiver Performance Loss.

| Channel | SFBC | Two Receiver (Unbalanced) | | | One Receiver |
|---|---|---|---|---|---|
| | | 0 dB | 3 dB | 6 dB | |
| ETU60 | YES | 0 | −1.2 | −2.2 | −3.8 |

In addition to a performance loss, the lack of the second receiver may also lead to a reduction in the overall coverage area size. Studies using the Okumuru-Hata propagation model with parameters including an edge data rate of 64 kbps for both downlink and uplink channels, a UE speed of 60 km/h, a suburban morphology, outdoor environment, a communications system with three sector sectorization and a 2×2 open loop space-frequency block coding (OL-SFBC) antenna configuration show that there is an approximate coverage area reduction of approximately 3.5 km. Table 2 summarizes the overall coverage area reduction.

TABLE 2

Two Receiver/One Receiver Coverage Area Reduction.
Coverage (km)

| Uplink | Downlink | |
|---|---|---|
| Two Receiver | Two Receiver | One Receiver |
| 11.78 | 16.31 | 12.68 |

As shown in Table 2, the downlink coverage area drops significantly with only one receiver. However, the coverage area is limited by the uplink coverage area, which is smaller than the smaller of the two downlink coverage areas.

However, due to the performance loss and the reduction in coverage area arising from a reduction in the diversity gain, a net reduction in downlink user throughput may be realized. At lower user throughput levels, such as 64 kbps, it may not be possible to meet some quality of service (QoS) requirements. Therefore, enhancements may be needed to boost user throughput while the UE is operating in switching operating mode.

Figure 4:
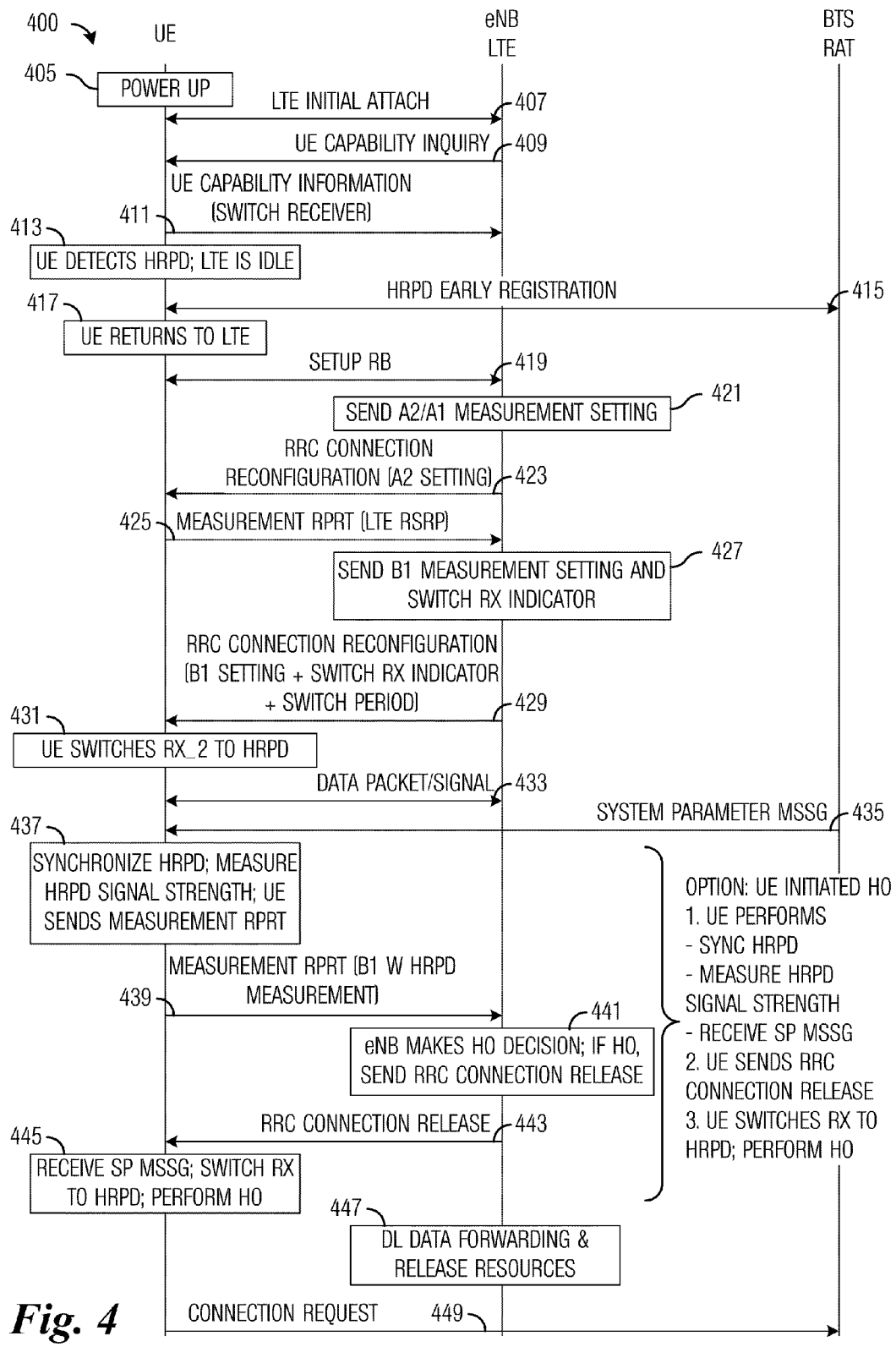
FIG. 4 is a diagram of a message exchange occurring in an eNB controlled closed loop parallel receiving interworking.

FIG. 4 illustrates a message exchange 400 occurring in an eNB controlled closed loop parallel receiving interworking Message exchange 400 may begin with the UE powering up (block 405). As the UE powers up, it may not be attached to any communications network and may need to join a communications network that it is capable of detecting. For discussion purposes, let the UE detect a LTE communications network.

After the UE detects the LTE communications network, the UE and an eNB in the LTE communications network perform an initial LTE attachment, wherein messages may be exchanged between the UE and the eNB (event 407). The messages exchanged between the UE and the eNB may allow the eNB to authenticate and authorize the UE, as well as provide system information that will allow the UE to operate in the LTE communications network.

The eNB may also inquire about the UE capabilities, for example, if the UE is capable of operating in switching operating mode or able to switch at least one of its receivers to an alternate RAT (event 409). The UE may respond to the inquiry from the eNB with a message that reports the UE's capabilities to the eNB (event 411). For example, if the UE is capable of operating in switching operating mode or switching at least one of its receivers to an alternate RAT, then the message may include indications indicating such information.

The UE may now be in a normal operating mode with the LTE communications network.

While in normal operations with the LTE communications network and not actively participating in a transmission, i.e., the UE is idle, the UE may detect the presence of a HRPD communications network (or some other communications network, such as CDMA, WiMAX, LTE-A, UMTS, and so forth) (block 413). Since the UE is idle, the UE may attempt to register with the HRPD communications network (event 415). The registration with the HRPD communications network may involve exchanging transmissions with a base terminal station (BTS) in the HRPD communications network and may involve authenticating and authorizing the UE, as well as retrieving system information from the HRPD communications network. Once the registration with the HRPD communications network completes, the UE may return to the LTE communications network. (block 417).

According to a preferred embodiment, the registration of the UE with the HRPD communications network may involve the use of a single transmitter and one receiver of the UE. Therefore, in a UE with multiple receivers, the UE may still remain connected to the LTE communications network. However, if the UE has only one transmitter, the UE will only be able to receive incoming LTE messages and not transmit LTE messages. Generally, the registration of the UE with the HRPD communications network or any other communications network does consume a lot of time and any LTE transmissions may be queued until the registration process completes.

When there is a transmission to or from the UE, resource blocks (RBs) must be configured and allocated for use with the UE (event 419) and the eNB may decide to transmit A2/A1 measurement settings to the UE (block 421). The eNB may transmit the A2/A1 measurement settings in a radio resource control (RRC) connection reconfiguration message with A2 settings to the UE (event 423). In response, the UE may measure a communications channel between itself and the eNB and send the results (either the measurement itself or a representation thereof) to the eNB in a measurement report (event 425).

The eNB may then decide to transmit B1 measurement settings and a switch receiver indicator to the UE (block 427). The decision to send B1 measurement settings and the switch receiver indicator may be based on factors such as UE support, communications channel measurement, network conditions, and so forth. The eNB may transmit the B1 measurement settings and the switch receiver indicator in the form of a RRC connection reconfiguration message with the B1 settings, the switch receiver indicator, and optionally, a switch period. The switch period may specify a duration that the UE should switch the receiver (event 429).

Upon receipt of the switch receiver indicator, the UE may tune at least one receiver to the alternate RAT (e.g., the HRPD communications network) (block 431). The UE maintains at least one receiver tuned to the LTE communications network while the at least one receiver is tuned to the HRPD communications network. Therefore, the UE may be able to receive transmissions from both the LTE communications network and while retrieving system information from the HRPD communications network (event 433 and event 435).

With the system information from the HRPD communications network, the UE may synchronize with the HRPD communications network. In addition, the UE may measure the signal strength of transmissions from the HRPD communications network and send a measurement report (block 437). The UE may send a measurement report containing the measured signal strength of the HRPD communications network to the eNB (event 439). Based on the measured signal strength of the HRPD communications network, the eNB may decide to handover the UE to the HRPD communications network (block 441). If the eNB decides to handover the UE to the HRPD communications network, the eNB may transmit a RRC connection release message to the UE (event 443).

The RRC connection release message may be used as an initiator for the inter-RAT handover. After the UE receives the RRC connection release message, which may contain system parameters (SP), the UE may switch all of its receivers to the HRPD communications network and participate in the inter-RAT handover (block 445). Since the UE already has system parameters for the HRPD communications network, the inter-RAT handover may proceed rapidly with small probability of failure. With the inter-RAT handover complete, the eNB may initiate a forwarding of all downlink data intended for the UE to the HRPD communications network and release resources allocated to the UE (block 447). The UE may transmit a connection request to the HRPD communications network to fully establish its connection with the HRPD communications network (event 449).

In an alternative embodiment, the UE may initiate the inter-RAT handover instead of the eNB. In the alternative embodiment, the UE may synchronize with the HRPD communications network, measure the signal strength of the HRPD communications network as previously described. The UE may initiate the inter-RAT handover by sending a RRC connection release message to the eNB and the UE may then switch its receivers to the HRPD communications network and participate in the inter-RAT handover. The operations and message exchange discussed herein may be in replacement of block 437, event 439, block 441, event 443, and block 445 shown in FIG. 4.

Figure 5:
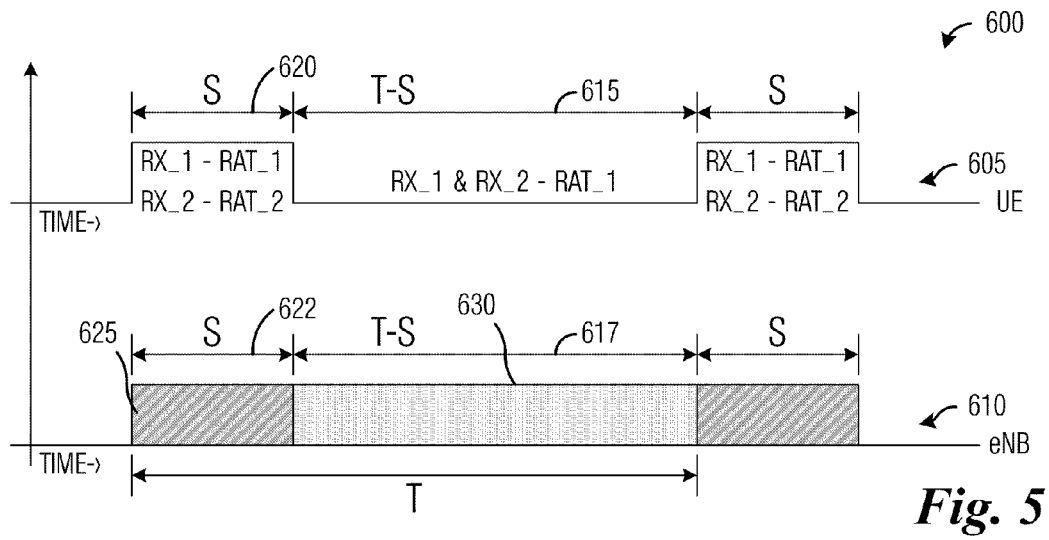
FIG. 5 is a first time-space diagram of receiver state of a UE and transmission scheduling of an eNB.

FIG. 5 illustrates a time-space diagram 600 of receiver state of a UE and transmission scheduling of an eNB. A first trace 605 represents receiver state of the UE and a second trace 610 represents transmission scheduling for the UE by the eNB. During intervals of time shown as intervals 615 and 617, both receivers of the UE are tuned to the current RAT, while during intervals of time shown as intervals 620 and 622, one receiver is tuned to the current RAT and one receiver is tuned to the alternate RAT. Let a total combined duration of the two intervals (interval 615 and interval 620) be T and a duration of interval 620 be S, then a duration of interval 615 is T-S.

While operating in interval 620, the UE has one receiver tuned to the current RAT and one receiver tuned to the alternate RAT. With the one receiver tuned to the current RAT, the UE may be able to maintain an existing connection with the current RAT, for example, a transmission control protocol (TCP) connection. Similarly, with the one receiver tuned to the alternate RAT, the UE may be able to retrieve system information, such as system parameters, communications channel parameters, perform signal strength measurements, and so forth, from the alternate RAT, which may be helpful in expediting an inter-RAT handover as well as reducing a probability of connection disconnection.

While, in interval 620 with only one receiver tuned to the current RAT, the UE may not be capable of achieving as high a data rate as when both of its receivers are tuned to the current RAT (such as during interval 615). Therefore, if the eNB continues to schedule transmission to the UE during interval 620 (first cross-hatched box 625) at the same rate as it does during interval 615 (second cross-hatched box 630), the UE may not be able to receive all of the transmissions. Consequently, some of the transmissions may be lost, potentially causing reduced system throughput when the failed transmissions are retransmitted. Therefore, adjustments may need to be made at the eNB when the UE does not have all of its receivers tuned to the current RAT.

Although the loss of one receiver may reduce the overall performance of the UE, the impact on the communications network performance may be negligible since the UE is already at a cell edge of a border cell, so its data rate may already be low. A further reduction in data rate may not significantly impact the communications network performance as a whole.

Although the discussion of FIG. 5 (as well as other Figures) focuses on a UE with two receivers wherein the UE can independently tune the two receivers to different RATs, the embodiments described herein are not limited to UEs with two receivers. The embodiments are operable with any number of receivers. Therefore, the discussion of two receivers should not be construed as being limiting to either the scope or the spirit of the present embodiments.

Figure 6A:
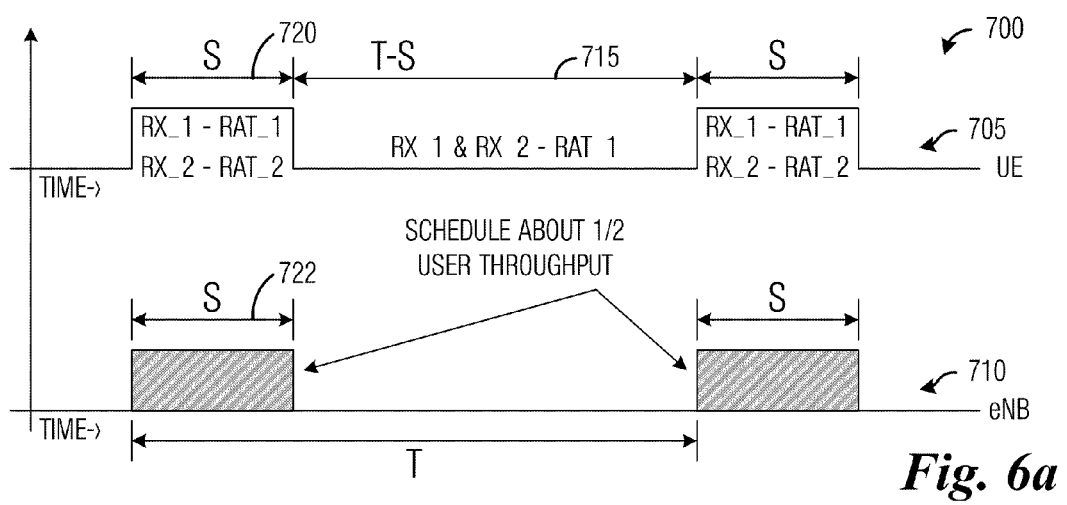
FIG. 6a is a second time-space diagram of receiver state of a UE and transmission scheduling of an eNB.

FIG. 6a illustrates a time-space diagram 700 of receiver state of a UE and transmission scheduling of an eNB. A first trace 705 represents receiver state of the UE and a second trace 710 represents transmission scheduling for the UE by the eNB. During an interval of time shown as interval 715, both receivers of the UE are tuned to the current RAT, while during intervals of time shown as interval 720, one receiver is tuned to the current RAT and one receiver is tuned to the alternate RAT. Let a total combined duration of the two intervals (interval 715 and interval 720) be T and a duration of interval 720 be S, then a duration of interval 715 is T-S.

According to a preferred embodiment, while the UE has one of its receivers tuned to the alternate RAT (e.g., interval 720 for the UE and interval 722 for the eNB), the eNB may reduce the amount of transmissions or data transmitted to the UE by an amount proportional to a ratio of the number of receivers tuned to the current RAT during interval 715 to the number of receivers tuned to the current RAT during interval 720. For example, if during interval 715, the UE has two receivers tuned to the current RAT and during interval 720, the UE has one receiver tuned to the current RAT, then during interval 720, the eNB should reduce the amount of transmissions (or data transmitted) to the UE by a factor proportional to a reduction in the number of receivers.

In a low signal-plus-interference-to-noise ratio (SINR) environment, data rate may change linearly with received power. Therefore, with the received power reduced by two (2) when each of the two receivers is tuned to a different RAT, the reduction in data rate is about two (2). Similarly, if the UE changes from three receivers down to two receivers, the eNB should reduce the amount of transmissions by about 3/2. When the UE has all of its receivers tuned back to the current RAT, then the eNB may restore the amount of transmissions to the UE.

The eNB may achieve a reduction in the amount of transmissions to the UE by altering the number of transmission opportunities (and resource blocks) allocated to the transmissions to the UE. For example, to reduce the amount of transmissions to the UE by about two (2), the eNB may reduce the number of resource blocks allocated to the UE by about two (2).

Only the amount of transmissions to the UE should be changed. If the eNB is also serving other UEs and they are not operating in switched operating mode, then the amount of transmissions to those UEs should not be changed. Furthermore, if the eNB is serving other UEs that are also operating in switched operating mode, then the amount of transmissions to those UEs should be changed by an amount proportional to the change in the number of receivers used by each of the UEs.

Figure 6B:
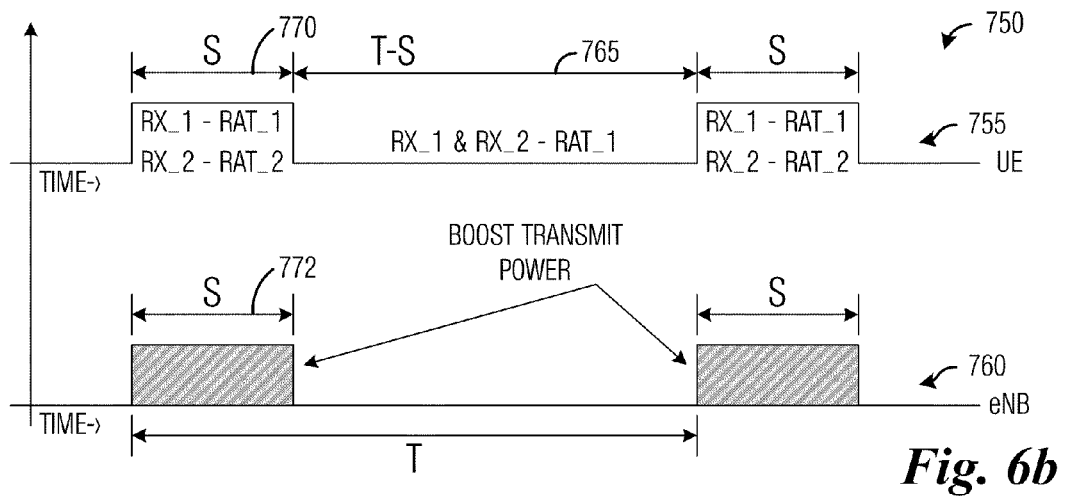
FIG. 6b is a third time-space diagram of receiver state of a UE and transmission scheduling of an eNB.

FIG. 6b illustrates a time-space diagram 750 of receiver state of a UE and transmit power of an eNB. A first trace 755 represents receiver state of the UE and a second trace 760 represents transmit power for the UE by the eNB. During an interval of time shown as interval 765, both receivers of the UE are tuned to the current RAT, while during intervals of time shown as interval 770, one receiver is tuned to the current RAT and one receiver is tuned to the alternate RAT. Interval 772 of second trace 760 corresponds to interval 770 of first trace 755.

According to a preferred embodiment, while the UE has one of its receivers tuned to the alternate RAT (e.g., interval 770 for the UE and interval 772 for the eNB), the eNB may boost the transmit power of transmissions to the UE by an amount proportional to a ratio of the number of receivers tuned to the current RAT during interval 765 to the number of receivers tuned to the current RAT during interval 770. For example, if during interval 765, the UE has two receivers tuned to the current RAT and during interval 770, the UE has one receiver tuned to the current RAT, then during interval 772, the eNB should boost the transmit power of transmissions to the UE by a factor of about two (2). Similarly, if the UE changes from three receivers down to two receivers, the eNB should boost the transmit power of transmissions to the UE by a factor of about 3/2. When the UE has all of its receivers tuned back to the current RAT, then the eNB may restore the transmit power of transmissions to the UE.

Only the transmit power of transmissions to the UE should be changed. If the eNB is also serving other UEs and they are not operating in switched operating mode, then the transmit power of transmissions to those UE should not be changed. Furthermore, if the eNB is serving other UEs that are also operating in switched operating mode, then the transmit power of transmissions to those UEs should be changed by an amount proportional to the change in the number of receivers used by each of the UEs.

Figure 7:
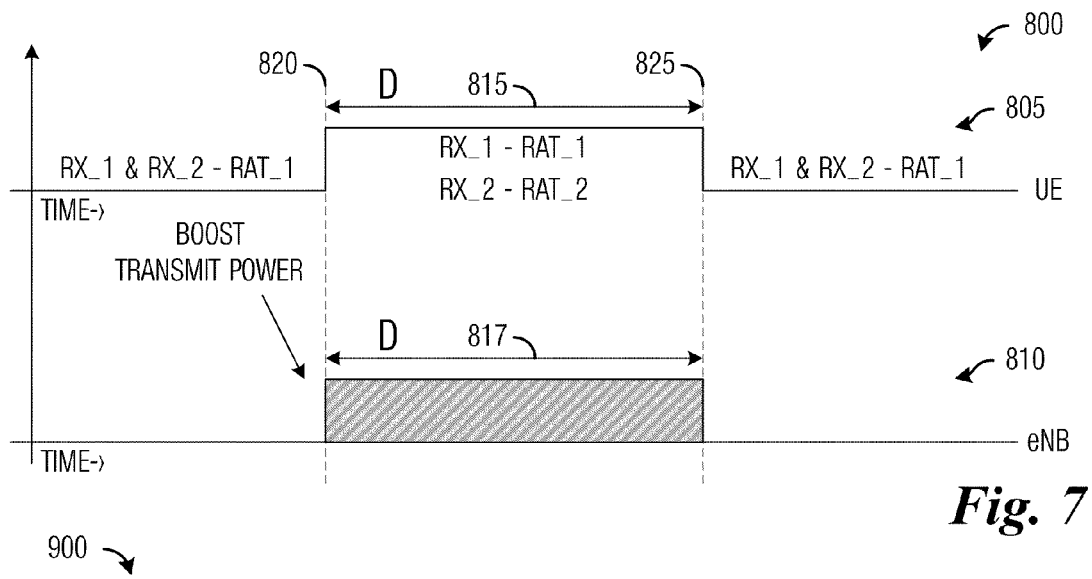
FIG. 7 is a third time-space diagram of receiver state of a UE and transmit power of an eNB.

FIG. 7 illustrates a time-space diagram 800 of receiver state of a UE and transmit power of an eNB. A first trace 805 represents receiver state of the UE and a second trace 810 represents transmit power for the UE by the eNB. An interval 815 of duration D represents a time when the UE has at least one receiver tuned to the alternate RAT. Event 820 indicates a time when the UE tunes the at least one receiver to the alternate RAT and event 825 indicates a time when an inter-RAT handover completes.

While the UE has at least one receiver tuned to the alternate RAT (interval 815), the eNB may compensate for a net reduction in the overall performance of the UE by boosting the transmit power of the transmissions made to the UE. The transmit power may be boosted for a duration (interval 817) that is substantially equal to the duration of the time that the UE has at least one receiver tuned to the alternate RAT (interval 815).

In general, an inter-RAT handover is complete when the eNB receives a confirmation message from its core network indicating that the inter-RAT handover is complete. Alternatively, a timer may be set up to time the inter-RAT handover. Therefore, when the timer expires, the eNB knows that the inter-RAT handover is complete. Preferably, the timer may be configured so that a duration of the timer is longer than an expected duration of a typical inter-RAT handover. If the duration of the timer is too long, then the eNB may be boosting transmit power for a longer duration than necessary, while if the duration of the timer is too short, then the eNB may not be boosting transmit power for a sufficiently long time.

According to a preferred embodiment, the transmit power of transmissions to the UE may be boosted by an amount proportional to a ratio of the number of receivers tuned to the current RAT during interval 815 to the number of receivers tuned to the current RAT when the UE is not operating in the switched operating mode. Only the transmit power of transmissions to the UE should be changed. If the eNB is also serving other UEs and they are not operating in switched operating mode, then the transmit power of transmissions to those UEs should not be changed. Furthermore, if the eNB is serving other UEs that are also operating in switched operating mode, then the transmit power of transmissions to those UEs should be changed by an amount proportional to the change in the number of receivers used by each of the UEs.

According to an alternative embodiment, instead of boosting the transmit power of the transmissions during interval 817, the eNB may reduce the amount of transmissions or data transmitted to the UE by an amount proportional to a ratio of the number of receivers tuned to the current RAT during interval 815 to the number of receivers tuned to the current RAT when the UE is not operating in the switched operating mode. Only the amount of transmissions to the UE should be changed. If the eNB is also serving other UEs and they are not operating in switched operating mode, then the amount of transmissions to those UEs should not be changed. Furthermore, if the eNB is serving other UEs that are also operating in switched operating mode, then the amount of transmissions to those UEs should be changed by an amount proportional to the change in the number of receivers used by each of the UEs.

Figure 8:
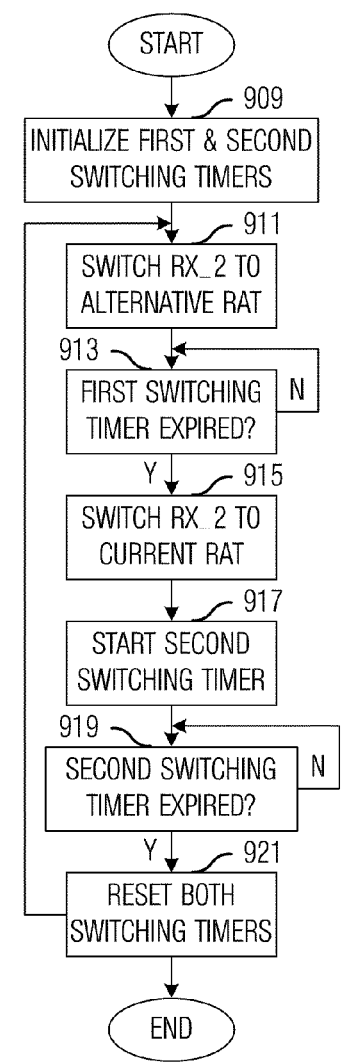
FIG. 8 is a flow diagram of UE operations in switched operating mode.

FIG. 8 illustrates a flow diagram of UE operations 900 in switched operating mode. UE operations 900 may be indicative of operations occurring in a UE operating in a first wireless communications network (e.g., LTE) as the UE participates in an inter-RAT handover to a second wireless communications network (e.g., HRPD). UE operations 900 may occur when the UE moves about a coverage area of the first wireless communications network.

UE operations 900 may begin with the UE initializing a first switching timer and a second switching timer (block 909). According to an embodiment, the first switching timer may be used to control the duration of the first specified amount of time, i.e., the amount of time that one of the UE's receivers spends tuned to the alternate RAT. The second switching timer may be used to control the duration of the second specified amount of time, i.e., the amount of time that the receiver that is used to tune to the alternate RAT spends tuned to the current RAT. As discussed previously, the durations of the first specified amounts of time and the second specified amounts of time may be based on factors such as the nature of the RATs involved, network conditions, channel quality indicators, and so on.

With the first switching timer initialized, the UE may tune one of its receivers to the alternate RAT (block 911) and keep it tuned to the alternate RAT until the first switching timer expires (block 913). According to an embodiment, the tuning of a receiver to the alternate RAT may involve a request from an eNB serving the UE to alter operation mode, i.e., reduce from Rank 2 to Rank 1, and generally cannot proceed unless the UE is able to alter its MIMO operation mode.

Once the first switching timer expires, the UE may retune the receiver to the current RAT (block 915) and start the second switching timer to control how long the receiver spends tuned to the current RAT (block 917). The receiver may remain tuned to the current RAT until the second switching timer expires (block 919). Once the second switching timer expires, the UE may reset both the first switching timer and the second switching timer (block 921) and return to block 911 to retune the receiver to the alternate RAT. UE operations 900 may continue until the UE no longer wishes to operate in switching mode. Alternatively, UE operations 900 may continue until the eNB instructs the UE to stop operating in switching mode.

FIG. 9*a* illustrates a flow diagram of eNB operations 1000 in switched operating mode. eNB operations 1000 may be indicative of operations taking place in an eNB that is serving a UE that is operating in switched operating mode. eNB operations 1000 may occur when the UE has tuned at least one receiver to the alternate RAT and the eNB is compensating for a corresponding drop in overall performance of the UE.

eNB operations 1000 may begin with the eNB receiving a measurement report from the UE (block 1002). The measurement report may include a measurement of a communications channel between the UE and the eNB and may be used by the eNB to place the UE in a switched operating mode. The eNB may place the UE in the switched operating mode if the measurement of the communications channel is below a threshold. The eNB may place the UE in a switched operating mode by transmitting a message to the UE containing an indicator that indicates that the UE is to operate in the switched operating mode (block 1003).

The eNB may then detect that the UE is operating in switched operating mode and that the UE has tuned at least one receiver to the alternate RAT (block 1005). The detection of the UE operating in the switched operating mode may be due to a receipt of a message from the UE indicating that it has switched to the switched operating mode, while the eNB may know when the UE has at least one receiver tuned to the alternate RAT because the eNB may have specified when the UE is to tune at least one receiver to the alternate RAT.

If the UE has not tuned at least one receiver to the alternate RAT then the eNB does not need to compensate for any drop in overall performance of the UE and eNB operations 1000 may terminate. If the UE has tuned at least one receiver to the alternate RAT, then the eNB may need to adjust a network parameter(s) to improve overall performance (block 1010). The network parameter(s) may be used to control network function such as transmission scheduling, transmission power, and so forth. Alternatively, rather than adjusting a network parameter, the eNB may change its own behavior (e.g., decision making process) when making decisions such as transmission scheduling, transmit power, and so forth. The eNB may continue operating with the adjusted network parameter(s) until the UE no longer has at least one receiver tuned to the alternate RAT (block 1015). When the UE no longer has at least one receiver tuned to the alternate RAT, the eNB may return the adjusted network parameter to its previous value or setting and eNB operations 1000 may terminate.

As discussed previously, in order for the UE to be operating in switched operating mode, the UE may be operating at a border cell. When the UE is operating at a border cell, it may be capable of receiving transmissions from both the current RAT and the alternate RAT. If the UE is at the cell edge of the border cell, the signal level of transmissions from the current RAT may be lower than the signal level of transmissions from the alternate RAT. This may be used as a condition for initiating an inter-RAT handover. Therefore, a measurement report from the UE that indicates that the signal level of transmissions from the current RAT is lower than a threshold may be a condition for having the UE operate in the switched operating mode.

FIG. 9*b* illustrates a flow diagram of eNB operations 1025 in switched operating mode. eNB operations 1025 may be an embodiment of adjusting network parameters to improve network performance, block 1010 of FIG. 9*a*.

The eNB may adjust network parameters to change a scheduling algorithm of transmissions to the UE to reduce an overall data rate of transmissions to the UE (block 1030). The eNB may reduce an overall data rate of transmissions to the UE by reducing a number of transmissions allocated to the UE or resource blocks allocated to the UE. The eNB may reduce the overall data rate by an amount proportional to a ratio of the number of receivers tuned to the current RAT while at least one receiver is tuned to the alternate RAT to the number of receivers tuned to the current RAT while no receiver is tuned to the alternate RAT. eNB operations 1025 may then terminate.

Changing the overall data rate of transmissions to the UE may minimally impact the overall performance of the communications network since the UE may already be operating at a low data rate since it is at a cell edge of a border cell.

FIG. 9c illustrates a flow diagram of eNB operations 1050 in switched operating mode. eNB operations 1050 may be an embodiment of adjusting network parameters to improve network performance, block 1010 of FIG. 9a.

The eNB may adjust network parameters to increase the transmission power of transmissions to the UE (block 1055). The eNB may boost the transmit power of transmissions to the UE by an amount proportional to a ratio of the number of receivers tuned to the current RAT while no receivers are tuned to the alternate RAT to the number of receivers tuned to the current RAT while at least one receiver is tuned to the alternate RAT. eNB operations 1050 may then terminate.

Boosting the transmit power of the transmissions may not alter the downlink data rate of transmissions to the UE, which may help to ensure that QoS requirements are maintained, as well as helping to keep customer satisfaction high.

FIG. 9d illustrates a flow diagram of eNB operations 1075 in switched operating mode. eNB operations 1075 may be an embodiment of adjusting network parameters to improve network performance, block 1010 of FIG. 9a. Instead of adjusting network parameters to periodically boost the transmit power of transmissions to the UE, the eNB may maintain the boosted transmit power until an inter-RAT handover that the UE is participating in completes.

The eNB may adjust network parameters to increase the transmission power of transmissions to the UE (block 1080). The eNB may boost the transmit power of transmissions to the UE by an amount proportional to a ratio of the number of receivers tuned to the current RAT while no receivers are tuned to the alternate RAT to the number of receivers tuned to the current RAT while at least one receiver is tuned to the alternate RAT.

The eNB may then check to determine if the inter-RAT handover is complete (block 1085). If the inter-RAT handover is not complete, then the eNB may continue to boost the transmit power. If the inter-RAT handover is complete, then the eNB may return the transmit power back to normal by returning the network parameters back to their original value (block 1090) and eNB operations 1075 may then terminate.

Boosting the transmit power of transmissions to the UE until the inter-RAT handover completes may be advantageous in that the UE does not experience a drop in data rate. Additionally, maintaining the transmit power boost for the entirety of the inter-RAT handover may simplify implementation since timers are not needed.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operation, the controller serving a communications device in a communications network, the communications device having at least two receivers, the method comprising:
   detecting that the communications device has at least one receiver tuned to a current radio access technology (RAT) and at least one receiver tuned to an alternate RAT;
   adjusting a network parameter to alter the communication network's performance, wherein the adjusted network parameter impacts only the communications device; and
   readjusting the network parameter back to its original value in response to determining that the communications device no longer has any receiver tuned to the alternate RAT.

2. The method of claim 1, wherein the detecting, the adjusting, and the readjusting are performed in response to determining that the communications device is operating in a switched operating mode.

3. The method of claim 1, further comprising:
   receiving a measurement report from the communications device; and
   transmitting a receiver switch message to the communications device in response to determining that the received measurement report meets a condition for the communications device to operate in switched operating mode.

4. The method of claim 3, wherein the condition comprises the received measurement report is below a threshold.

5. The method of claim 1, wherein the network parameter controls an overall data rate of transmissions to the communications device.

6. The method of claim 5, wherein the controller adjusts the overall data rate of transmissions to the communications device.

7. The method of claim 6, wherein the overall data rate is reduced by a first factor proportional to a ratio of a number of receivers tuned to a current RAT while at least one receiver is tuned to the alternate RAT to a number of receivers tuned to the current RAT while no receiver is tuned to the alternate RAT.

8. The method of claim 7, wherein the number of receivers tuned to a current RAT while at least one receiver is tuned to the alternate RAT is equal to one and the number of receivers tuned to the current RAT while no receiver is tuned to the alternate RAT is equal to two, and wherein the first factor is equal to about two.

9. The method of claim 1, wherein the network parameter controls a transmit power of transmissions to the communications device.

10. The method of claim 9, wherein the controller adjusts the transmit power of transmissions to the communications device.

11. The method of claim 10, wherein the transmit power is increased by a second factor proportional to a ratio of a number of receivers tuned to a current RAT while no receiver is tuned to the alternate RAT to a number of receivers tuned to the current RAT while at least one receiver is tuned to the alternate RAT.

12. The method of claim 11, wherein the number of receivers tuned to a current RAT while at least one receiver is tuned to the alternate RAT is equal to one and the number of receivers tuned to the current RAT while no receiver is tuned to the alternate RAT is equal to two, and wherein the second factor is equal to about two.

13. A method for controller operation, the controller serving a communications device in a communications network, the method comprising:
   receiving a measurement report from the communications device;
   transmitting a receiver switch message to the communications device; and
   in response to determining that the communications device has at least one receiver tuned to an alternate radio access technology (RAT),
      adjusting transmission parameters of transmissions to the communications device, wherein the adjusted network parameter impacts only the communications device, and
      readjusting the transmission parameters back to their original values in response to determining that the communications device no longer has any receiver tuned to the alternate RAT.

14. The method of claim 13, wherein the communications device periodically tunes a receiver to the alternate RAT, and the method further comprises, repeating the adjusting and the readjusting each time the communications device tunes a receiver to the alternate RAT.

15. The method of claim 13, wherein transmission parameters comprises overall data rate, and transmit power.

16. The method of claim 15, wherein adjusting overall data rate comprises, adjusting a number of transmissions made to the communications device or a total number of resource blocks allocated to the communications device.

17. The method of claim 13, wherein readjusting comprises, resetting the transmission parameters back to values prior to the adjusting.

18. The method of claim 13, wherein the controller serves a plurality of communications devices, wherein a subset of the communications devices has at least one receiver tuned to the alternate RAT, and wherein the adjusting comprises, independently adjusting transmission parameters of transmissions for each communications device in the subset of communications devices.

19. A method for controller operation, the controller serving a communications device in a communications network, the method comprising:
   receiving a measurement report from the communications device;
   transmitting a receiver switch message to the communications device;
   adjusting a network parameter to alter the communication network's performance, wherein the adjusted network parameter impacts only the communications device; and
   readjusting the network parameter back to its original value in response to determining that the communications device has completed an inter-radio access technology (inter-RAT) handover with an alternate communications system, wherein the alternate communications system uses the alternate RAT.

20. The method of claim 19, wherein the transmission parameter controls a transmit power of transmissions to the communications device.

21. The method of claim 19, wherein adjusting the network parameter increases the transmit power of transmissions.

22. The method of claim 19, further comprising, prior to the adjusting, receiving a message from the UE, the message indicating that the UE has tuned a receiver to the alternate RAT.

23. The method of claim 19, wherein the determining that the communications device has completed the inter-RAT handover comprises:
   receiving a confirmation message; or
   a handover timer expires.

* * * * *